[11] 3,548,098

[72] Inventor Walter Horst Ernst Spyra
Hamburg, Germany
[21] Appl. No. 706,955
[22] Filed Feb. 20, 1968
[45] Patented Dec. 15, 1970
[73] Assignee U.S. Philips Corporation
New York, N.Y.
a corporation of Delaware, by mesne assignment
[32] Priority Feb. 25, 1967
[33] Germany
[31] No. P41494

[54] CONTROL CIRCUIT FOR A HIGH-VOLTAGE GENERATOR TUBE

6 Claims, 1 Drawing Fig.

[52] U.S. Cl. 178/7.5, 178/6
[51] Int. Cl. H04n 3/18
[50] Field of Search 178/6PS, 7.5E

[56] References Cited

UNITED STATES PATENTS 2,435,414 2/1948 Sziklai 178/6(PS)
3,346,763 10/1967 Stark, Jr. 178/7.5(E)
3,375,436 3/1968 Denton 178/6(PS)

*Primary Examiner*—Richard Murray
*Attorney*—Frank R. Trifari

ABSTRACT: In a television circuit of the type having a line deflection stage and a separate tube stage for producing a high voltage, negative pulses from the deflection stage are applied to the grid of the high-voltage generator tube by way of a diode and a network having a short charge time constant and a relatively long discharge time constant.

T 5117
Rm

PATENTED DEC 1 5 1970 3,548,098
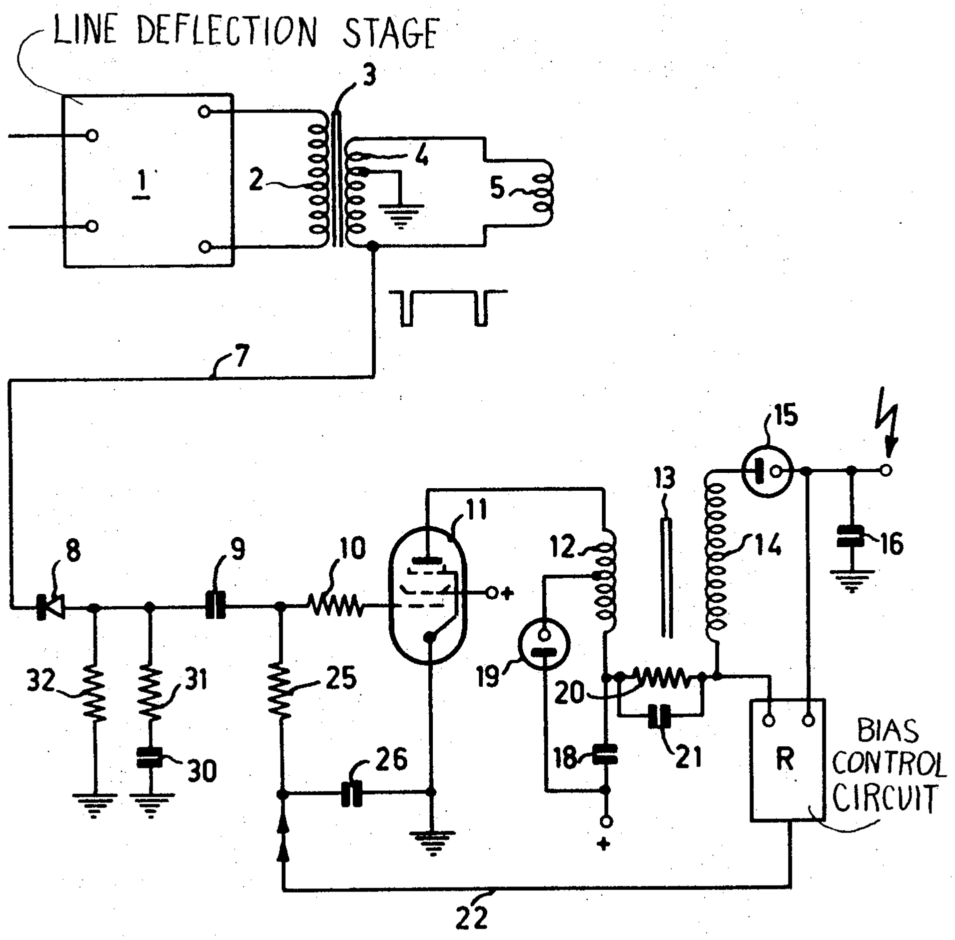
INVENTOR.
WALTER H. E. SPYRA
BY
AGENT

CONTROL CIRCUIT FOR A HIGH-VOLTAGE GENERATOR TUBE

The invention relates to a television receiver circuit arrangement having a line deflection stage and a separate high-voltage generator tube which is controlled by pulses from the line deflection circuit.

In known circuit arrangements of this type, at least one and preferably two pulses were applied to a tube in a control stage for the high-voltage generator in which a pulse of suitable form was formed by means of networks consisting of several members and an amplifier tube.

However, this can be achieved with comparatively low cost and without essential drawbacks if, according to the invention, a negative pulse of the line deflection circuit with an amplitude which is large relative to the control range of the generator tube is applied, through a diode which passes said pulse, to a network which is connected to the grid of the generator tube, the network consisting of the series arrangement of a capacitor and a first resistor and a second resistor connected parallel to the series arrangement and being proportioned so that the leading edge (cutoff edge) of the pulse is supplied to the grid substantially unaltered and that the capacitor is then charged and that after omission of the pulse the capacitor carries a voltage which cuts off the generator tube in the first part of the next interval, the said voltage decaying according to the discharge through the series arrangement of the two resistors with a time constant which lies in the order of the pulse duration in such manner that the generator tube is conducting at the end of the interval exactly in the required measure.

In order that the invention may be readily carried into effect, it will now be described in greater detail, by way of example, with reference to the accompanying drawing.

In a line deflection stage 1 which is controlled in normal manner, for example, in a television receiver, a periodic, sawtooth shaped current is produced which is applied to the primary 2 of a transformer 3, from the secondary 4 of which it is applied to the deflection coils 5 and produces there a magnetic field. A tap of the winding 4 is connected to earth and at its one end negatively directed flyback pulses are derived through a line 7 which pulses, of course, may alternatively be derived from any other winding of the transformer 3. These pulses are applied to the cathode of a diode 8, for example, of the type BA 148; from its anode the pulses are applied, through a separating capacitor 9 of 1 *n*F and a decoupling resistor 10 of 1 kΩ, to the grid of the generator tube 11 of the type PL 505. At the applied screen grid voltage of approximately 250 Volt, this tube has a grid cutoff voltage of approximately −170 Volt.

In the anode circuit of the tube 11 is connected the primary winding 12 of a transformer 13, the high-voltage secondary 14 of which is connected to a rectifier diode 15 and a succeeding charge capacitor 16 from which the high direct voltage is derived. Between a tap of the winding 12, the other end of which is connected to the positive terminal of the supply source of approximately 290 Volt through a storage capacitor 18 of 0.1 μF, is further connected the positive terminal of a diode 19 through which the energy stored in the transformer inductance in the interval after the high-voltage pulse is applied to the capacitor 18 which supplies part of the supply voltage.

The end of the high-voltage winding 14 remote from the diode 15 is connected, through the parallel arrangement of a resistor 20 approximately 100kΩ which is preferably adjustable and a capacitor 21 of 10 *n*F to the junction of the winding 12 and the capacitor 18 and thus to the supply point of the generator circuit. At the RC-member 20, 21 and/or from the high-voltage capacitor 16 there may exist connections to a known control circuit R by which the grid bias of the generator tube 11 is controlled through the line 22 through a series resistor 25 of 270 *k*Ω. The control line 22 is further connected to earth through a capacitor 26 of 100 *p*F and also the cathode of the tube 11 is connected to earth.

In known manner an approximately pulsatory control voltage is applied to the circuit with the generator tube 11, by which voltage the tube is periodically cutoff and conducting. In the conducting interval a current flows from the tube 11 through the primary 12 and stores magnetic energy in the transformer 13. When the tube 11 is cut off said energy with the connected capacitances, in particular also the stray capacitances, oscillates in a free oscillation in such manner that a half a period lasting, an approximately sine shaped pulse of high voltage appears at the winding 14, the peak of which is rectified.

According to the invention a large negative pulse of approximately −700 Volt is derived from the line deflection circuit 1-—5 in each period and is applied to the diode 8 through the line 7. This pulse is very much larger than the control range of the generator tube 11. A network which consists of the series arrangement of a capacitor 30 of 560 *p*F and a resistor 31 of 56 kΩ, to which a resistor 32 of 47 kΩ is connected in parallel, is connected to the anode of the diode 8. As a result of the action of the resistor 31, the leading edge of the negative pulse, substantially unaltered, is applied to the grid of the tube 11; since this pulse has a very large amplitude, said edge is very steep and thus produces the required rapid cutoff of the generator tube 11. During the middle part of the pulse which in general is approximately dome-shaped, at any rate varies with an essentially smaller slope, negative charge then flows to the capacitor 30 through the resistor 31 and the open diode 8. The time constant of said series arrangement of approximately 30 μS is considerably larger than the pulse width which is approximately 11 μS. So the capacitor is not charged to the full peak value of the pulse but its voltage becomes only approximately 200 Volt more negative in the pulse interval. As a result of the rectifier action of the diode 8, on the one hand the part of the negative voltage which lies between the pulses of the winding 4 and which usually is sawtoothlike or arched, is cut off; on the other hand a means value of the negative voltage is transmitted from the capacitor 30 also to the capacitor 9 in such manner that always a negative bias is applied to the anode of the diode 8 as a result of which the cutoff threshold is still shifted somewhat in the negative direction to approximately −50 Volt.

On the trailing edge of the pulse of the line 7, the voltage at the anode of the diode 8 rapidly returns to less negative values and the diode 8 is cut off as soon as said voltage has reached the value to which the capacitor 30 is charged. Said capacitor is then charged through the resistors 31 and 32, and a value corresponding to approximately half of the capacitor voltage as a result of the voltage division across resistors 31, 32 is applied to the grid of the tube 11 through the coupling capacitor 9. Through other means, in particular through the control line 22, said tube has a certain negative bias voltage and it becomes conductive when the voltage transmitted through the capacitor 9 and the voltage of the control line 22 is less negative than corresponds to the cutoff point of the tube 11. The tube 11 is then conducting, the anode current increases, and thus also the magnetic energy stored in the transformer 13 increases until the generator tube 11 is again cut off by the leading edge of the next pulse.

The decrease of the cutoff voltage for the tube 11 and opening of said tube occur with the time constant given by the capacitor 30 and the resistors 31 and 32 which with approximately 60 μS lies in the order of the period of 64 μS. As a result of this an abrupt opening of the tube 11 is avoided.

As a result of the proportioning of the elements 30, 31 and 32, and as a result of the supplied DC bias control voltage it can be achieved that the tube 11 is conducting not more and not longer than is required for producing the desired high voltage at the capacitor 16.

The circuit arrangement according to the invention which is controlled immediately from the output circuit of the line deflection circuit 1 has the additional advantage that also the control for the generator tube 11 is omitted if, for example, the line deflection circuit 1 does not operate. As a result of the separating capacitor 9 a control alternating voltage is applied to the tube 11, which voltage has a negative and a positive part which opens the tube 11. The DC bias control voltage which is supplied, for example, through the line 22 and which may be derived from a fixed voltage source can thus have a value which adjusts the tube 11 to an operating point lying far below the maximum load. When the control pulses are omitted, the tube 11 can consequently not be overloaded; in this case it should be ensured at any rate that the grid bias voltage of the tube 11, for example, when the high voltage is omitted, is not varied by the control stage R in an inadmissible manner in a positive direction.

Since the diode 8 is to transmit the negatively directed edge of the pulse without delay, this diode should be chosen to be of a type which has no essential inertia of the current increase; in a high-voltage generator circuit in a television receiver, the inertia of said diode should constitute less than 0.1 $\mu$S.

I claim:

1. A television receiver-circuit comprising an electron discharge tube, a line deflection stage including means for producing negative pulses at line frequency that have amplitudes substantially greater than the grid cut off voltage of said tube, biasing means connected to the grid of said tube, a network comprising a diode, a first resistor connected between the anode of said diode and a point of constant potential, and a series circuit of a first capacitor and second resistor connected between the anode of said diode and said point, a second capacitor connected between the anode of said diode and said biasing means, means applying said pulses to the cathode of said diode, and an output circuit for producing a high voltage connected to the anode of said tube, said first and second resistors and first capacitor being proportioned to apply the leading edge of said pulses substantially directly to said grid, and having a discharge time constant of the order of the period of said pulses.

2. A circuit as claimed in claim 1 wherein the time constant of said first capacitor and said second resistor is substantially two to five times that of said pulse width.

3. A circuit as claimed in claim 1 wherein the time constant of said first capacitor, and said first and second resistors is substantially one half to three times the pulse repetition period.

4. A circuit as claimed in claim 1 wherein the switching time of said diode is small with respect to the rise time of said pulses.

5. A circuit as claimed in claim 1 wherein said biasing means is coupled to said output circuit.

6. A circuit as claimed in claim 1 wherein said output circuit comprises a transformer having a primary winding coupled to said anode, and a secondary winding; and a peak value rectifying circuit coupled to said secondary.